US006405202B1

(12) United States Patent
Britton et al.

(10) Patent No.: US 6,405,202 B1
(45) Date of Patent: Jun. 11, 2002

(54) SYSTEM AND METHOD FOR ADDING PROPERTY LEVEL SECURITY TO AN OBJECT ORIENTED DATABASE

(75) Inventors: David E. Britton, Annandale; Nicholas E. Karangelen, Arlington, both of VA (US)

(73) Assignee: Trident Systems, Inc., Fairfax, VA (US)

( * ) Notice: Subject to any disclaimer, the term of this patent is extended or adjusted under 35 U.S.C. 154(b) by 0 days.

(21) Appl. No.: 09/300,398

(22) Filed: Apr. 27, 1999

Related U.S. Application Data
(60) Provisional application No. 60/083,079, filed on Apr. 27, 1998.

(51) Int. Cl.[7] .............................................. G06F 17/30
(52) U.S. Cl. ........................ 707/9; 707/8; 707/201; 709/219; 709/225; 711/163
(58) Field of Search ........................... 707/6, 8, 9, 201, 707/10, 204; 709/225, 219, 201, 226; 711/163

(56) References Cited

U.S. PATENT DOCUMENTS

| 5,826,268 A | * | 10/1998 | Schaefer et al. ............... 707/9 |
| 5,857,180 A | * | 1/1999 | Hallmark et al. .............. 707/2 |
| 5,878,415 A | * | 3/1999 | Olds .............................. 707/9 |
| 6,088,717 A | * | 7/2000 | Reed et al. .................. 709/201 |
| 6,141,679 A | * | 10/2000 | Schaefer et al. ............ 709/201 |
| 6,192,370 B1 | * | 2/2001 | Primsch ....................... 707/103 |
| 6,192,405 B1 | * | 2/2001 | Bunnell ....................... 709/225 |
| 6,126,135 A1 | * | 4/2001 | Brodersen et al. .......... 707/201 |
| 6,289,382 B1 | * | 9/2001 | Bowman-Amuah ......... 709/206 |

OTHER PUBLICATIONS

Milen, Jonathan K. et al., "Security for Object-Oriented Database Systems", Proceedings of the Computer Society Symposium on Research in Security and Privacy, May 4–6, 1992, pp. 260–272.*

* cited by examiner

Primary Examiner—Hosain T. Alam
Assistant Examiner—Shahid Alam
(74) Attorney, Agent, or Firm—Hunton & Williams

(57) ABSTRACT

The present invention discloses a method and system for improved user access control to an Object Oriented Database (OODB) based on property level security. Property level access control specifies who can access each piece of information within an object of an OODB. Embodiments of the present invention include a database comprising at least one object, the object containing at least one property and a property access control list comprising at least one property level permissions set. The property access control list may be used to control user access at the property level of an OODB. The present invention may further include a group access list including the identity of groups that have access to the property.

43 Claims, 9 Drawing Sheets

Property Access Control List
300

| | | |
|---|---|---|
| 1 | Property Name 1 | Permissions Ctl. # |
| 2 | Property Name 2 | Permissions Ctl. # |
| 3 | Property Name 3 | Permissions Ctl. # |
| 4 | Property Name 4 | Permissions Ctl. # |
| | ■ | ■ |
| | ■ | ■ |
| | ■ | ■ |
| | ■ | ■ |
| Z-3 | | Permissions Ctl. # |
| Z-2 | | Permissions Ctl. # |
| Z-1 | | Permissions Ctl. # |
| Z | Property Name Z | Permissions Ctl. # |

Index Reference List

400

| Index Reference #1 | Property Name 1 |
|---|---|
| Index Reference #2 | Property Name 2 |
| Index Reference #3 | Property Name 3 |
| ■ | |
| ■ | |
| ■ | |
| ■ | |
| Index Reference Z-1 | Property Name Z-1 |
| Index Reference Z | Property Name Z |

SYSTEM AND METHOD FOR ADDING PROPERTY LEVEL SECURITY TO AN OBJECT ORIENTED DATABASE

This application claims benefit of Provisional appln No. 60/083,079 filed Apr. 27, 1998.

TECHNICAL FIELD

This invention relates generally to an improved method for object oriented programming and more particularly, to a system and method for adding property level security to an Object Oriented Database (OODB).

BACKGROUND OF THE INVENTION

In recent years, the use of object oriented programming (OOP) languages to build software applications has increased. An object is a distinct unit in a program that is made up of a plurality of properties having attributes, relationships or methods. Based on these properties, objects can have certain characteristics and can perform certain actions. An object oriented programming language encapsulates an object's characteristics and behaviors within a single block of source code. Thus, programmers can simply create a new object that inherits many of its features from existing objects. This approach makes OOP more efficient than conventional programming techniques for developing software applications.

As the use of OOP languages has increased, so has the use of Object Oriented Databases (OODBs). OODBs allow objects created in these applications to be stored, managed, and retrieved more efficiently than standard relational databases. Due to the popularity of OOP, demand has risen for larger sized OODBs with the capacity to handle multiple users. As OODBs grow in size and more users are added, the need for regulating access to the databases arises. To regulate how the information in the database is modified or deleted, developers have implemented different types of database security (also referred to as "user access control"). Currently, OODBs use two types of user access controls: database level access and conventional object level access. Database level access control gives the user either complete access or no access to any of the information in the database. Current object level access controls regulate user access to each object individually, however requiring additional overhead.

Database users often access related pieces of information. An access domain is a group of properties containing data that is related in such a way that a user would want to access the group all at once. For example, in a database containing requirements for the construction of a naval vessel, all information regarding electrical requirements would be located in one access domain. An electrical engineer would be interested in only those requirements having to do with electrical systems. To this end, database and object level security provides a flexible means to control access to information as long as the access domains are organized so that a domain covers a single object or groups of objects. As described below, solutions restricting a user to specific properties of an object are inefficient.

Figure 1A:
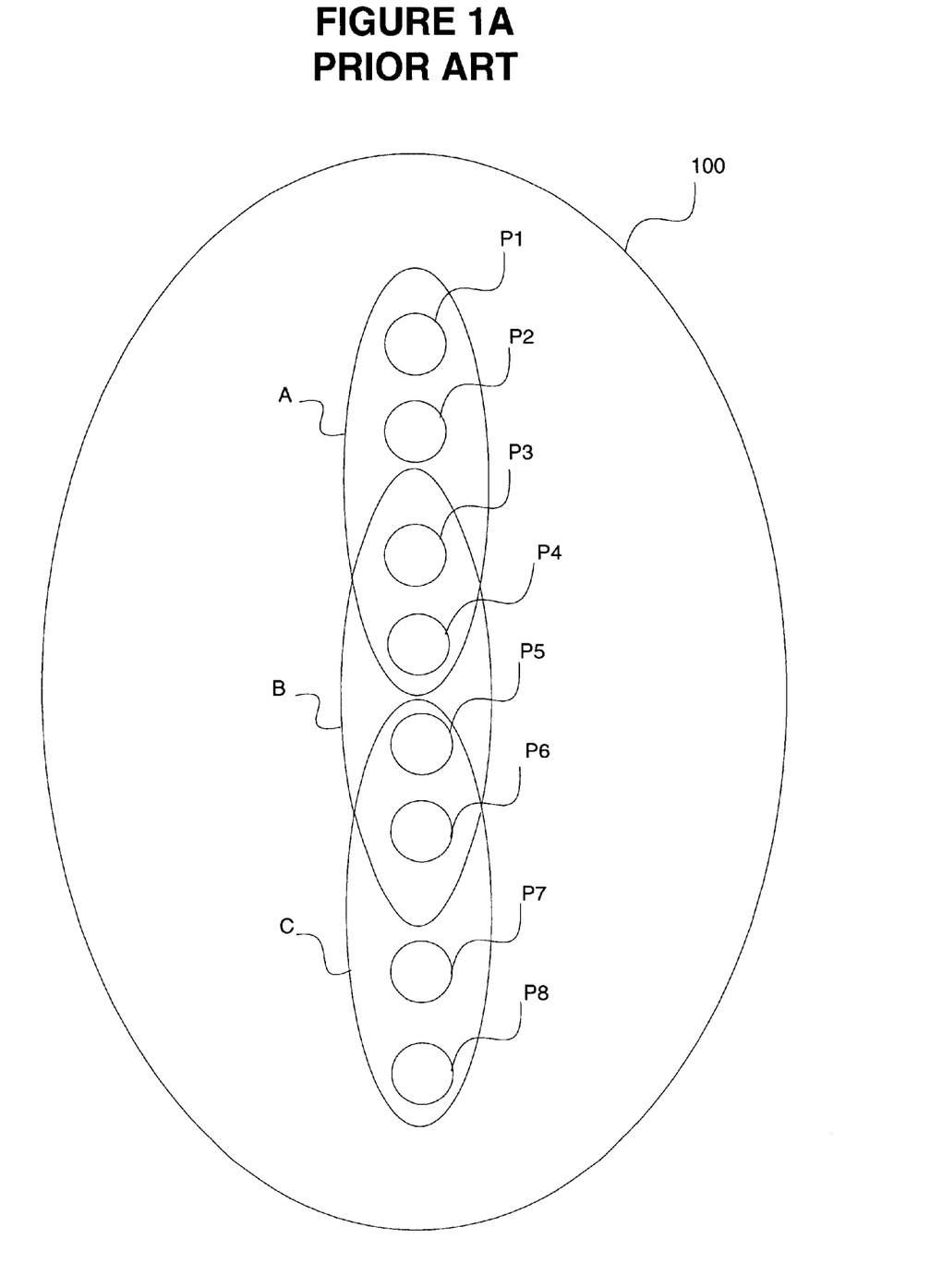
FIGS. 1A–1C illustrate prior art techniques for providing object level user access control to Object Oriented Databases (OODBs).
Figure 1B:
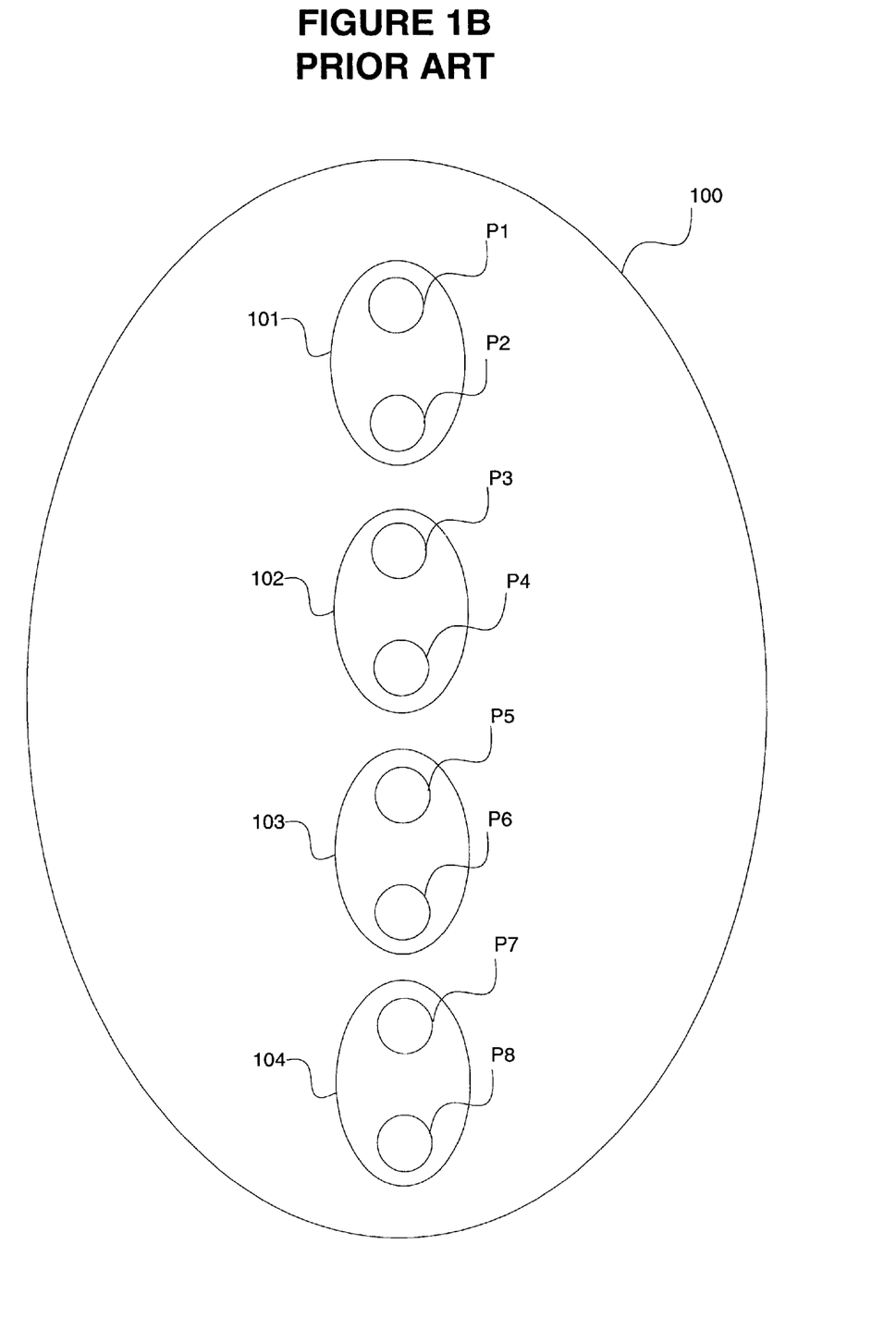
Figure 1C:
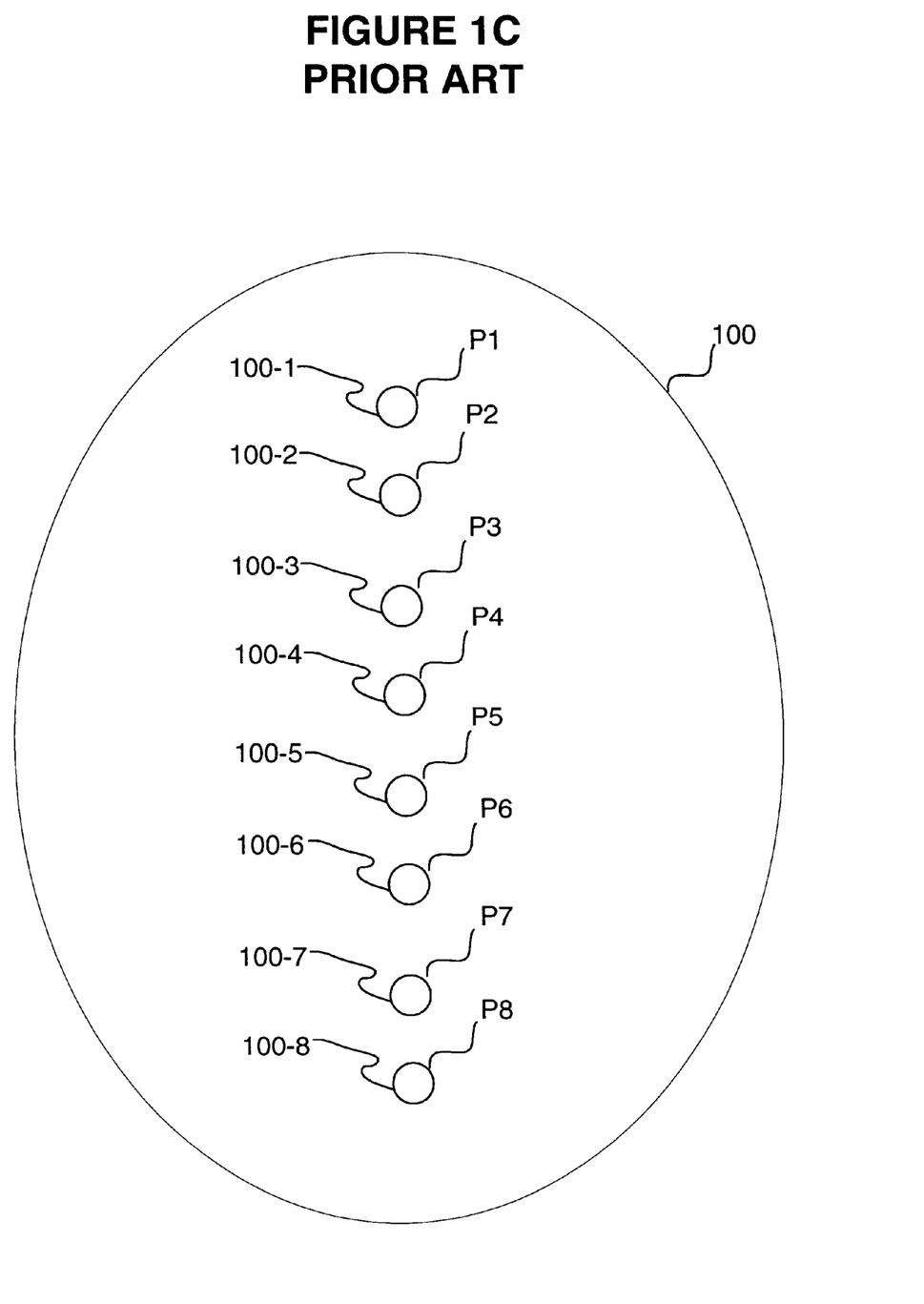

In general, each object contains information that covers multiple domains, such as cost, physical, electrical, performance, power, and human related attributes as well as interconnections (relationships) with other objects in the system. FIGS. 1A–1C show conventional methods for providing object level user access control to OODBs. FIG. 1A shows an object 100 having properties P1–P8. Object 100 further has domains A, B, and C, where domain A contains properties P1–P4, domain B contains properties P5–P8 and domain C contains properties P3–P6.

To provide object level security, using conventional techniques, object 100 is partitioned into sub-objects 101–104 as shown in FIG. 1B. As further shown in FIG. 1b sub-object 101 contains properties P1–P2, sub-object 102 contains properties P3–P4, sub-object 103 contains properties P5–P6 and sub-object 104 contains properties P7–P8. Accordingly, access is controlled by object level security through limiting each user's access to, for example, sub-object 101, then 102. To the user, access to specific properties is intended to appear as domain A. Using this technique precludes the control of a fourth domain, for example, domain D, after object 100 has been partitioned. Since a fixed number of domains must be determined up front, modification of the partitioned object 100 becomes extremely difficult.

To overcome the above-described problem, one product COR, has attempted to provide security access at the property level. Using a second conventional object level security approach, each property P1 to P8 is partitioned into sub-objects 100-1 to 100-8, as shown in FIG. 1C. Although this approach is more flexible, the division of objects into a plurality of sub-objects further increases the complexity of object management using conventional methods. Instead of managing just one object, the database must manage multiple sub-objects as well. Here, the database must determine which objects have the information it needs while maintaining track of all objects. As the number of objects increase, the system becomes bogged down with the increased overhead. Thus, conventional object level security approaches are disadvantageous.

As specialization continues to increase with system complexity, individual professionals will access only selected domains of information, some of which will span subsets of multiple objects. For example, a network engineer may require access to electrical and performance domains as well as relationships specifying interconnections, but not necessarily to cost information. Therefore, there is a need to control access at the domain level. Since domains consist of a group of one or more properties and domains can overlap, there is a need to efficiently control access at the property level. There is also a need for improved object level access control for cases where an object contains properties that cover multiple domains. OODB vendors, for example, Versant Corp., Object Design, Computer Associates, GemStone Systems, Inc. and Ardent Software, Inc. have not provided this level of access control or security. Accordingly, there is a need for property level access control that can be implemented in a flexible and efficient manner.

SUMMARY OF THE INVENTION

Embodiments of the present invention solve the problems encountered in the prior art by providing flexible property level security for controlling user access to information within a single object. Property level access control specifies who can access each piece of information (property) within an object of an OODB. Embodiments of the present invention include a database comprising at least one object, the object containing at least one property and a property access control list comprising at least one property level permissions set. The property access control list may be used to control user access at the property level of an OODB. The present invention may further include a group access list including the identity of groups that have access to the property.

Other embodiments of the present invention may comprise a database comprising at least one object, and at least one object level permissions control number. The object level permissions control number may be used to control user access at the object level of an OODB. The present invention may further include a group access list including the identity of groups that have access to the object. Further, the present invention may be embodied in an ontology management system (OMS) supporting an OODB.

Accordingly, the present invention overcomes the deficiencies of the prior art by providing a system and method for applying property level controls to properties of OODB objects. Further, the present invention provides enhanced and efficient user access control at the object level.

BRIEF DESCRIPTION OF THE DRAWINGS

The invention will be described in detail herein with reference to the following figures in which like reference numbers refer to the elements, and wherein.

DETAILED DESCRIPTION

The principles of the present invention are illustrated in several embodiments, each of which provides a system and method for providing object oriented database security and/or user access control at the various levels including at least one of the object level and the property level.

Characteristic level access control introduces a third type of database security that permits increased flexibility and control of user access to Object Oriented Data Bases (OODBs). Property level access control, in accordance with the present invention, regulates user access to specific properties located within an object.

Figure 2:
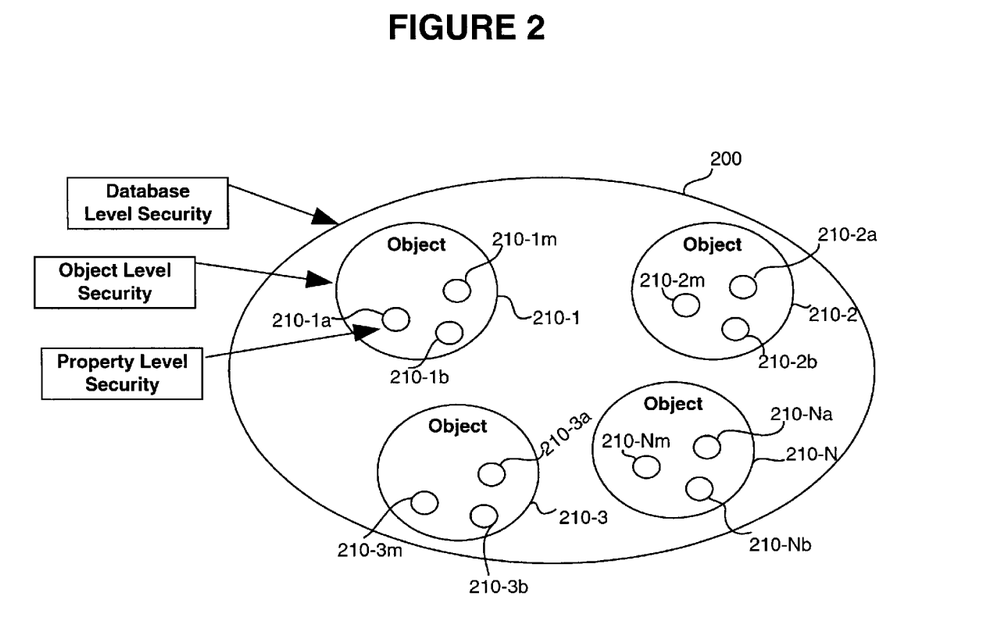
FIG. 2 is an illustration of multiple security levels as used in embodiments of the present invention.

FIG. 2 shows an embodiment of the present invention illustrating an OODB 200. The OODB 200 may include a plurality of objects 210-1 to 210-N, where 'N' is the number of objects in the OODB. As is well known in the art, an object is a distinct unit in a program that is made up of a plurality of properties having attributes, relationships or methods. Based on these properties, objects can have certain characteristics and can perform certain actions. For example, an object may include shapes, and/or pictures that appear in a display screen and can perform certain actions. Such objects may be, for example, windows, buttons and/or menus that perform a certain task when the user selects or clicks the particular object. In addition, objects can include less tangible software entities, for example, routines and subroutines or other sub-parts of a program that may be copied and reused by the user when writing a larger program. The objects 210 may further include a plurality of properties 210-1a to 210-1m in object 210-1, 210-2a to 210-2m in object 210-2, 210-3a to 210-3m in object 210-3, up to 210-Na to 210-Nm in object 210-N, where 'm' is the number of properties in each object. It is to be understood that 'm' may be the same or may be a different number for each respective object 210-1 to 210-N. Accordingly, embodiments of the present invention may permit user access control of, for example, individual properties 210-2a to 210-2m in object 210-2.

Figure 3:
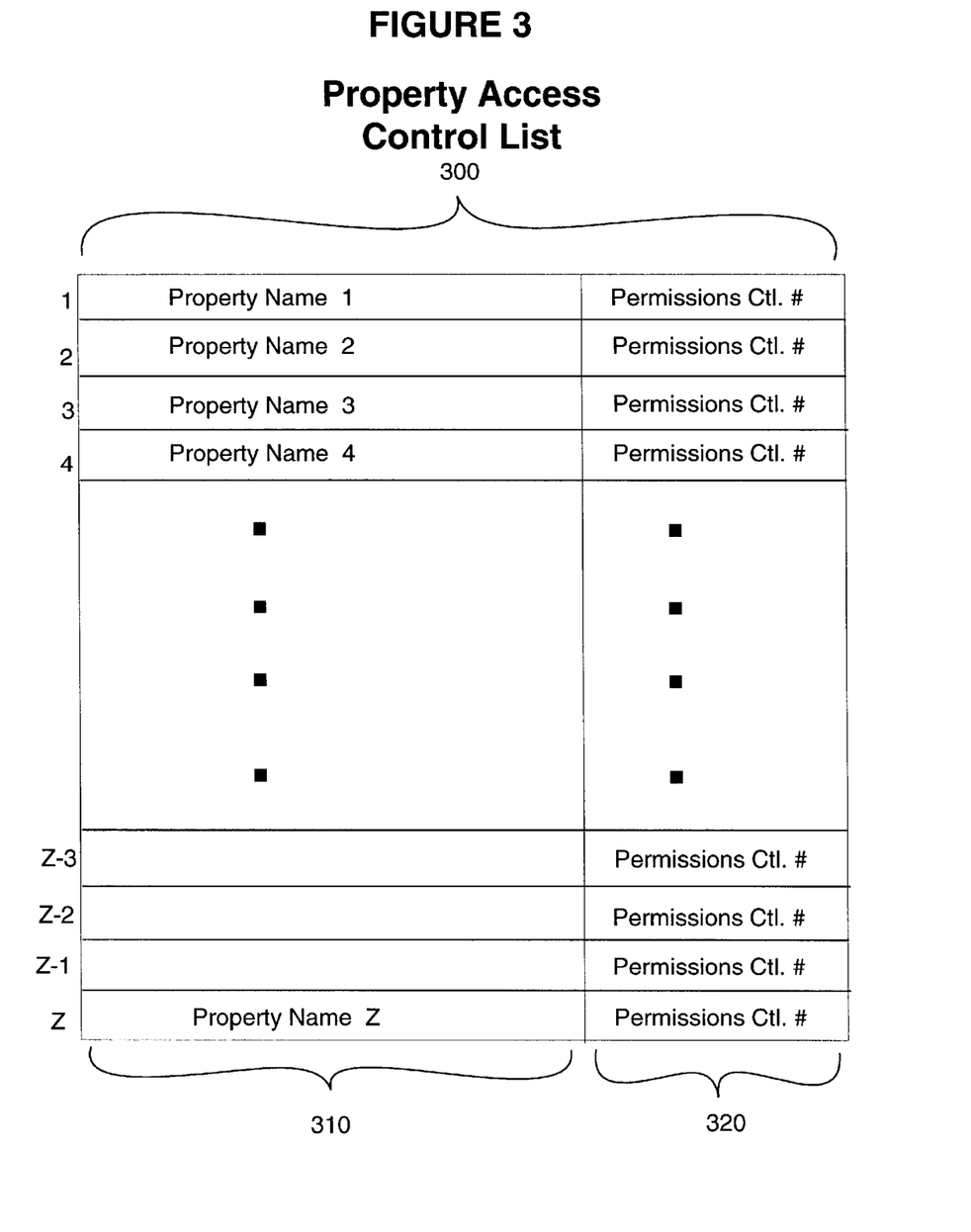
FIG. 3 is a property access control list in accordance with embodiments of the present invention.

Embodiments of the present invention may include a property access control list 300 as shown in FIG. 3. The property access control list 300 may permit access based on, for example, a variable object-property approach. In one embodiment, the variable object-property approach may provide property level security for those properties in an object that require permissions different from the object itself. For example, if only property 210-1a has permissions different from its corresponding object 210-1, then the property access control list 300 may contain at least the name of property 210-1a. All of the other properties 210-1b to 210-1m may retain the permissions of the object 210-1. Thus, the property names for properties 210-1b to 210-1m may not be included in the property access control list 300 under this embodiment. Accordingly, the size of the property access control list 300 may vary between zero entries and the number of properties having permission different from the object, up to 'z'. Property level access may be provided by using a property level permissions control number. In alternative embodiments of the present invention, the object may contain an object level permissions control number (not shown), that contains the permissions for the objects 210-1 to 210-N. The object level permissions control number may regulate access to each object in accordance with embodiments of the present invention.

Each object 210-1 to 210-N may have a corresponding property access control list, similar to list 300 having property/permissions set pairs, stored in the object. A permissions set may comprise a property name along with a corresponding property level permissions control number. The property level permissions control number may specify the level of access permitted to a plurality of users and/or user groups desiring access to the property. This list 300 may contain a property name identifying each property having permissions different from the object, in column 310. The property access control list 300 may further include a column 320, having corresponding permissions control numbers for properties listed in column 310. Alternative embodiments of the present invention may include a permissions set containing a database level permissions set, an object level permissions set, and a property level permissions set.

As further described below, the permissions control number may specify the read, write, and execute access for, for example, the owner of the object (i.e., owner access), each group in the object's group access list (i.e., group access) and/or for other users who are not the owner and do not belong to any group in the object's group access list (other users access).

The property level permissions control numbers in column 320 may designate, the specific read, write and/or execute capabilities permitted for each of the corresponding property names listed in column 310. In alternative embodiments of the present invention, the property access control list 300 may include entries, for example, of all property names for properties 210-1a to 210-1m in object 210-1. In yet other alternative embodiments, column 310 may include a property number identifier representing the property name.

Referring again to FIG. 3, each list 300 may be stored with its respective object or in the alternative, the list 300 may be stored external to the object in the database management system. The storage overhead incurred for each property in the user access control list 300 may be, for example, 4 bytes for each permissions control number in, for example, column 320 plus the number of bytes for each property name in column 310. Thus, for example, if the average length of the property name in column 310 is 10 bytes, the total overhead will be approximately 14 bytes (e.g., 10 bytes for each property name in column 310 and 4 bytes for each permissions control number in column 320). It is understood that the size of each permissions control number and/or the property name is given by way of example only and may vary as appropriate.

Figure 4:
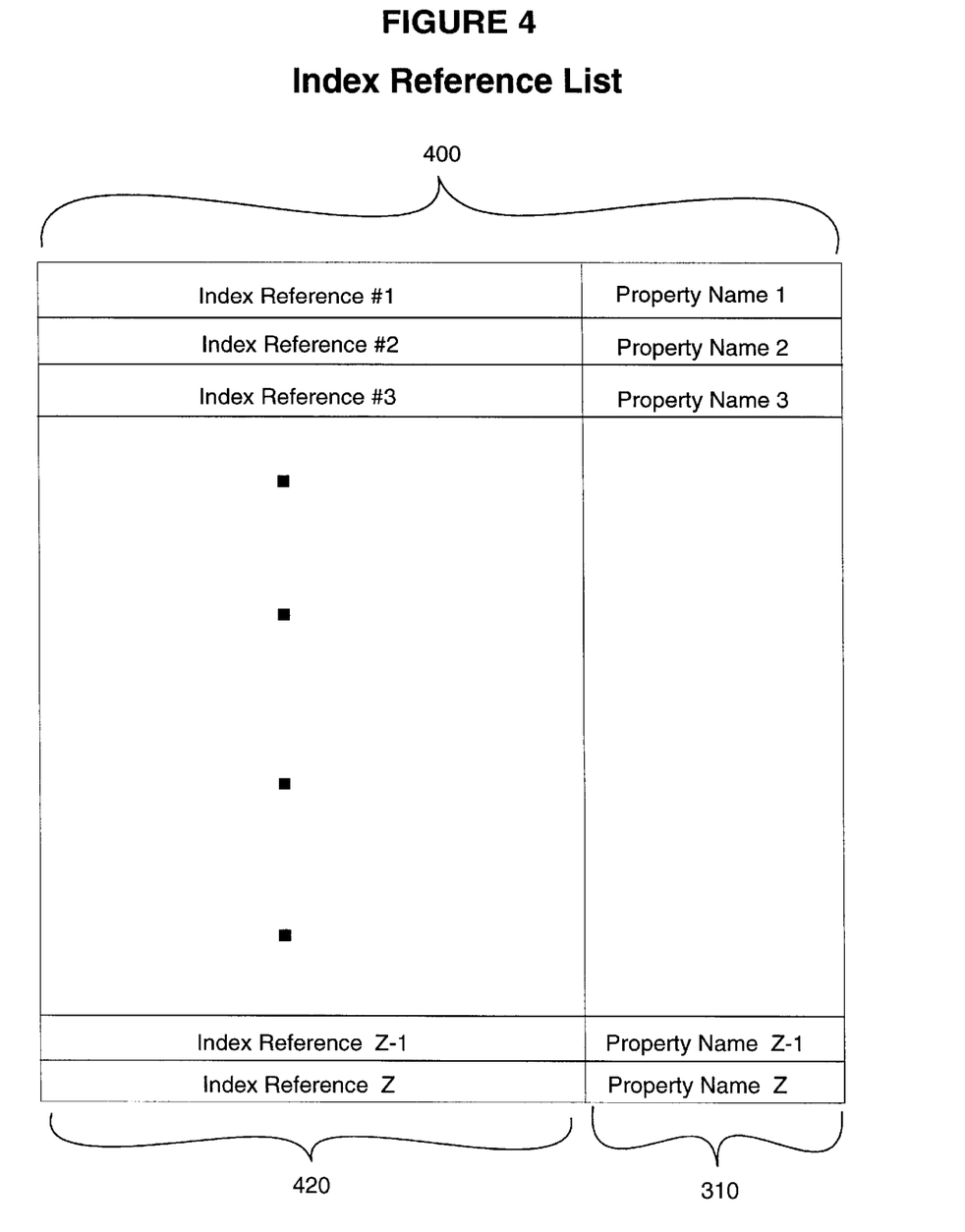
FIG. 4 is an index reference list in accordance with embodiments of the present invention.

In alternative embodiments of the present invention, the property name in column 310 may be indexed in an index reference list 400 as shown in FIG. 4. Thus, index reference list 400 may include index reference numbers in column 420 ranging from 1 to 'z', and referencing the actual property names in column 310. If the index reference list 400 is utilized, the property access control list 300 may include index reference numbers from list 400 and corresponding permissions control numbers in column 320. The index reference numbers 420 may identify the property names 310 in list 400. Accordingly, the overhead needed for the user control list 300 may be reduced. For example, using an index reference list 400, the total overhead for the property access control list 300 may be reduced to 8 bytes per property (e.g., 4 bytes for each index reference number in column 310 and 4 bytes for each permissions control number in column 320). No additional storage may be required for the index reference list 400 since the OODB will likely contain a list of all properties within the OODB. In alternative embodiments, the index reference list 400 may be stored external to the object in the database management system.

Under embodiments of the present invention, when no property level permissions are set, (i.e., either the owner of the object did not enable user control access or all the properties 210-1a to 210-1m in, for example, object 210-1 retain the permissions relating to their corresponding object), then there may be no entries in the property access control list 300 and, therefore no associated overhead. As indicated earlier, each object 210-1 to 210-N may have its own corresponding property access control list 300 for its respective properties.

In an embodiment of the present invention, when a user tries to access, for example, property 210-1b in object 210-1 of OODB 200, the system of the present invention may access a property access control list 300. The system may check each entry in list 300 to find a match for the property name the user desires to access. Thus, the system may determine that the entry of 310-2 in column 310 matches the desired property name for property 210-1b. Next, the corresponding property level permissions control number 320-2, in column 320, may be acquired and analyzed to determine the level of access the user may have. As described earlier, column 310 may instead contain only the reference index number indexing the property name in list 400. In this case, list 400 may be searched first to find the index reference number identifying the location of the desired property 210-1b in list 300. Once the index number from list 400 is identified, the index number may be used to determine the corresponding property level permissions control number in column 320 of list 300. Based on the corresponding permissions control number 320-2, the system may determine that the user is the owner of the object and thus, has full permissions (i.e., the permissions control number may be 111, as described below). Accordingly, the user's may be given full read, write and execute permissions to the desired property 210-1b. Alternatively, if the user is someone other than the owner of the object and is not in any of the groups in the group access list, the user may only be given read and write permissions (i.e., the property level permissions control number may be 110, as described below). In alternative embodiments of the present invention, the permissions control number 320-2 may include an identifier for the user along with the 3 bit binary number indicating the permissions allowed to this user. Thus, this user identifier may be matched with the identity of the user trying to access the OODB 200 to determine which permissions are allowed to this user. The list 300 may contain a plurality of entries for the same property, each entry identifying a separate user. Accordingly, each entry may be compared until a match is found identifying the user requesting access to the desired property.

The processing overhead for the above-described check is considered small in comparison to the processing of the overall request. For example, the upper limit for the processing overhead may be reached when the entire property access control list 300 is searched for the correct property (attribute, method or relationship)(i.e., desired property based on the property name). While the probability of having to search the entire property access list 300 may be considered remote, the processing involved in embodiments of the present invention is minimal as compared to the overall processing involved in partitioning objects under conventional methods.

Figure 5:
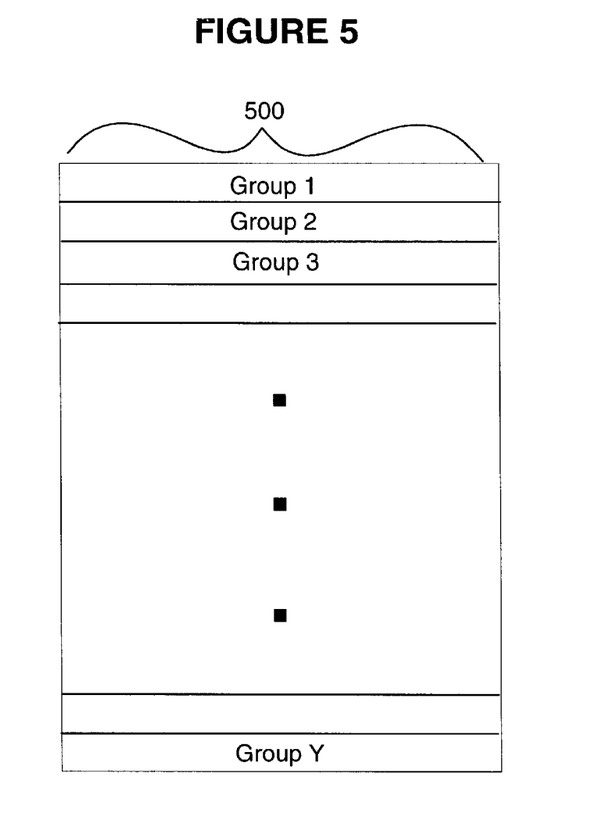
FIG. 5 is a group access list in accordance with embodiments of the present invention.

Embodiments of the present invention may include a group access list 500 as shown in FIG. 5. Group access list 500 may include a list of all user groups that have access to the properties in the object. For example, group 1 may be the Accounting group, group 2 may be the Engineering group, and group 3 may be the Human Resources group. Accordingly, the group access list 500 may have entries for a plurality of user groups having access to the property. As many as 'y' groups may be listed in the group access list 500, where 'y' may be any number based on the total number of groups having access to the property. Each group may further include a plurality of users belonging to the group who have access to the property based on the permissions control number of their respective group. Each object may have its own group access list 500 and the list 500 may reside in the object. In the alternative, the group access list may reside external to the object in the database management system.

Figure 6:
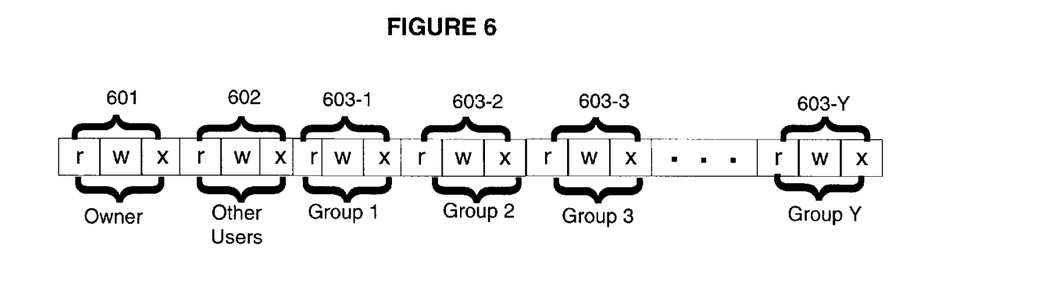
FIG. 6 is an example of a permissions control number in accordance with embodiments of the present invention.

In a preferred embodiment of the present invention, the Unix file system security approach, which specifies read, write, and execute permissions for different users, may be utilized. Under the Unix approach, read, write and execute permissions are specified by a permissions set and/or permissions control number. The permissions control number for each property or object may comprise a plurality of three bit binary fields so that any number between 0 and 7 may be represented. Each three bit field may represent property level or object level access control for, for example, the owner of the object (e.g., owner access), each group in the object's group access list (e.g., group access) and/or any user who is not the owner and is not in any group access list (e.g., other user access). FIG. 6 shows an example of a permissions control number having a plurality of 3 bit fields, for example, field 601 designating owner access and field 602 designating other user access. Fields 603-1 to 603-y may designate group access for groups 1 to 'y' as indicated in FIG. 6. The position of each group field in the permissions control number corresponds to, for example, each user group in the object's group access list 500. The number of fields may vary depending on the total number of users and/or groups having access to the property. Each bit in the three-bit field described above specifies read (r), write (w), and execute (x) permissions, as read from left to right. In an embodiment of the present invention, a binary '0' may represent that the specified permission is not allowed, while a binary '1' may represent that the specified permission is allowed. For example, the no permissions control number is 000 (0 in decimal) and the full permissions control number (read, write, and execute) is 111 (7 in decimal). Thus, just the read and write permissions would be 110 (6 in decimal), since the read bit is 1, the write bit is 1, and the execute bit is 0. As indicated above, this structure may be used to allocate different permissions to different users and/or user groups. For example, the owner of the object can be allocated full permissions and thus field 601, indicating owner access, may be 111 (r, w, x) indicating that the user has read, write and execute permissions. Field 602 may be 100 (r,w,x) indicating that the other user only has read access. As described above, a property is an attribute, relationship, or method of an object. One of ordinary skill in the art will understand that, for some attributes and relationships within objects, only read and write permissions may be considered, as they are generally not executed. Accordingly, a permissions control number of 110 (6 in decimal) may represent full permissions for a property that can not be executed. Alternatively, for methods of an object, all permissions may apply. Thus, the read control bit may regulate both reading the routine source code as well as providing the method as an extensible method that may be executed by a user having execute permissions. The write control bit would regulate any modifications to the source code for the routine. Finally, the execute control bit would regulate the execution of, for example, the routine.

In embodiments of the present invention, a permissions control number may comprise as little as three bits representing owner access if only the owner of the object has access to the property. In the alternative, if a plurality of groups in a group access list have access to the property, the permissions control number may be 8 or more bytes depending on the number of groups 'y' in group access list 500.

The three bit binary (octal) values are given by way of example only, and any suitable number of bits may be utilized to represent, for example, the read write and execute permissions for each group in a group access list. The bit values may be inverted in accordance with different operating standards so that, for example, a binary '0' may represent that the specified permission is allowed, while a binary '1' may represent that specified permission is not allowed.

In an embodiment of the present invention, the variable object-property security may be enforced and hidden behind the "get and set" routines for the object. As is well known in the art, "get and set" routines in an object regulate reading and writing of data within the object. The property access control list 300 may be checked each time a request is made to read or write data within the corresponding object to determine the level of access the users may have for the desired property. In alternative embodiments of the present invention, the object may have an object level permissions control number that may contain permissions for access to the object. The user may be the owner of the object, or a member of a group in the group access list or another user and may have access to the object based on the object level permissions control number. The user may have the same level of access for each property within the object except for those properties having permissions different from the object. For properties having different permissions, the property access control list 300 may be accessed to determine the level of access the user may be given based on the property level permissions control number.

Figure 7:
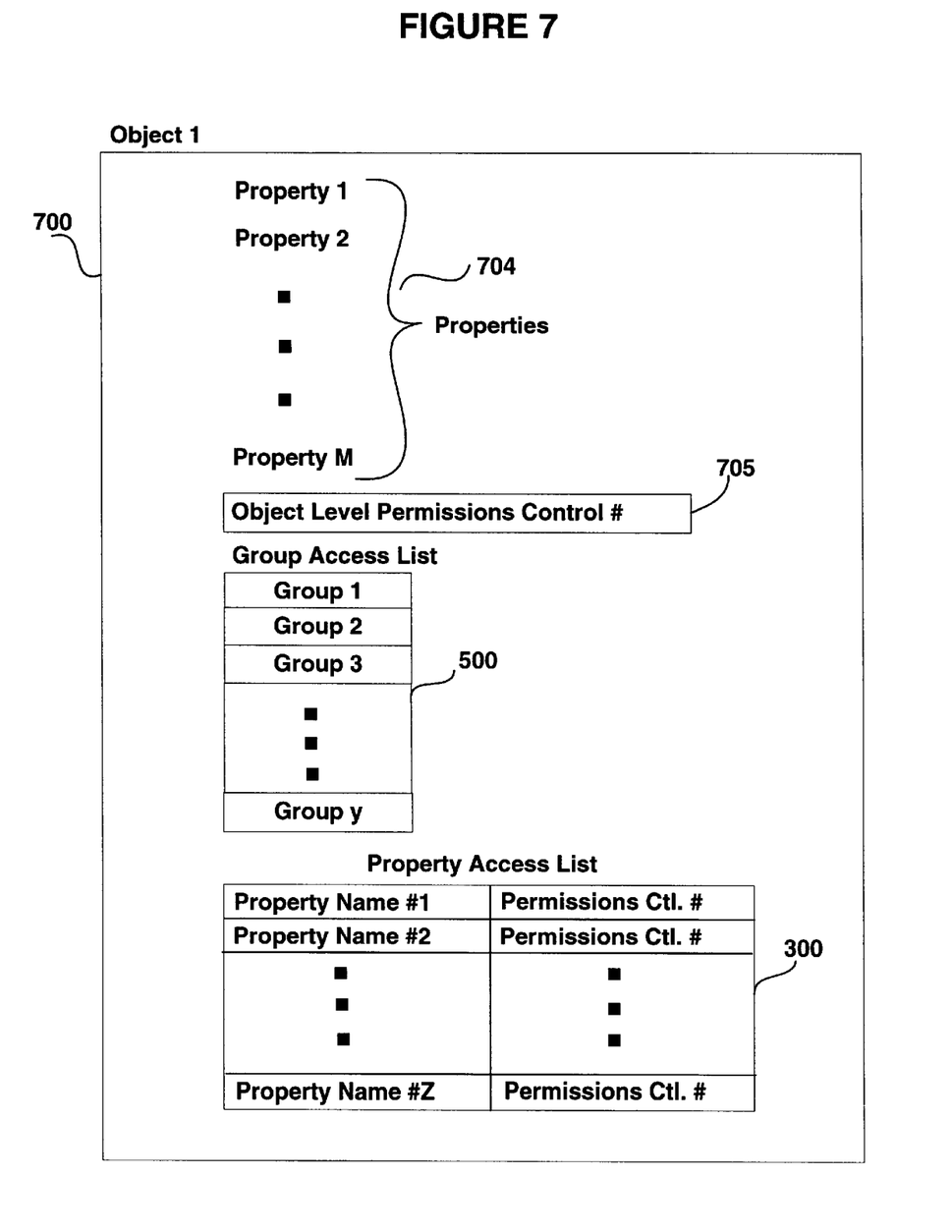
FIG. 7 is an example of an object in accordance with embodiments of the present invention.

FIG. 7 illustrates an example of an object in accordance with an embodiment of the present invention. FIG. 7 shows, for example, object 700 residing in a OODB (not shown). The object may include an object level permissions control number 705, permitting access to the object. Object 700 may further include properties 704, e.g., properties 1 to property 'm', where 'm' is any number of properties within object 700. Object 700 may further include a group access list 500 having group 1 to group 'y', where 'y' is any number of groups having access to the property. Object 700 may also include the property access list 300 having property names 1 to 'z' and corresponding property level permissions control numbers 1 to 'z', where 'z' may be greater-than or equal to 0 and less-than or equal to 'm' ($0 \leq z \leq m$).

Figure 8:
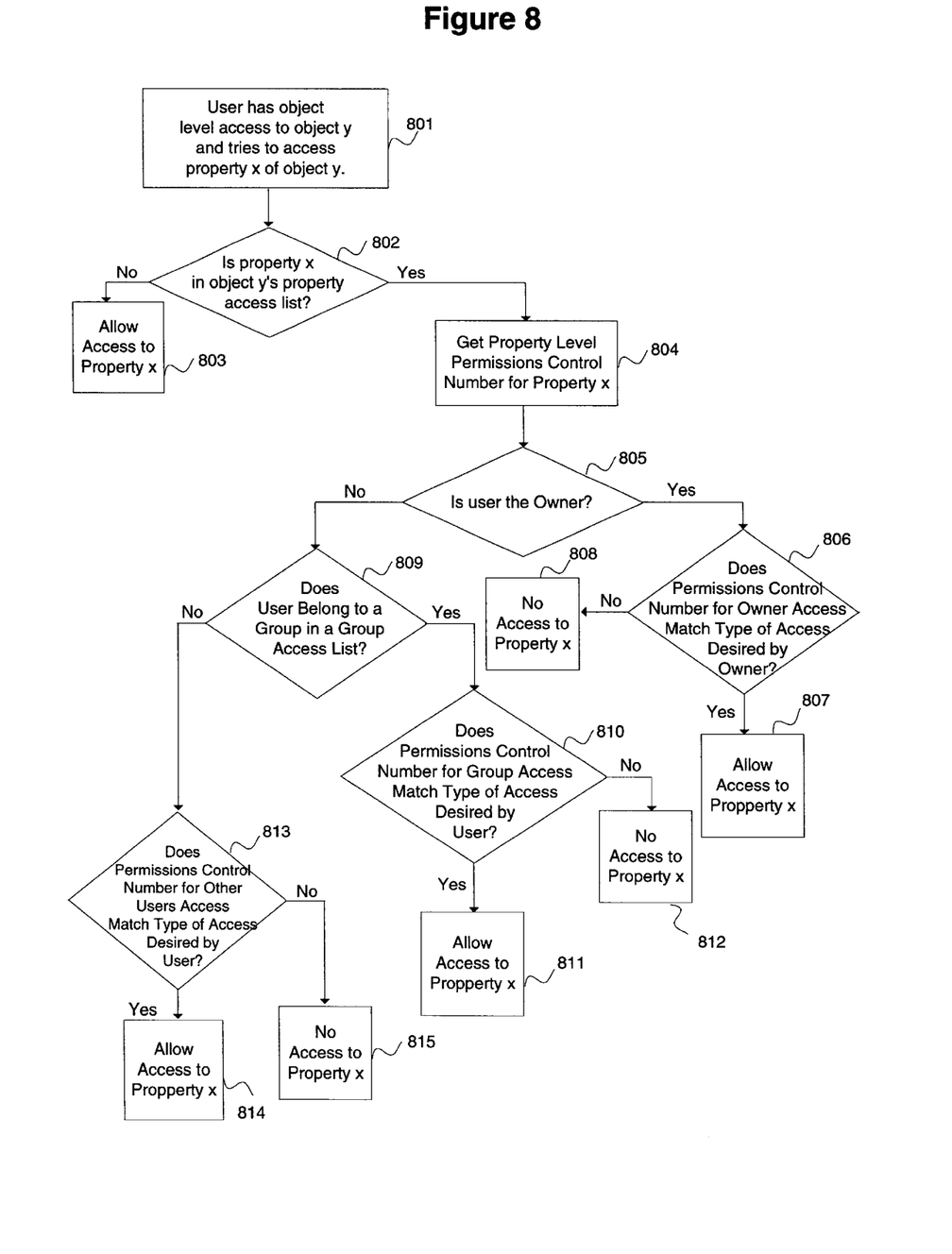
FIG. 8 is a flow chart relating to embodiments of the present invention.

FIG. 8 is a flow chart illustrating an embodiment of the present invention. As shown in step 801, a user may access an OODB and the user may have object level access to object y. The object level access for the user may be indicated by the object level permissions control number as described above. As further shown in step 801, the user may try to access property x of object y. If property x is not in object y's property access list, the user may be given access to property x as shown in steps 802 and 803. If, however, property x is in object y's property access list, then the system may acquire the property level permissions control number for property x, as shown in step 804. As shown in step 805, the system may determine whether the user is the owner of the object. If the user is the owner of the object, the system may determine whether the property level permissions control number for owner access matches the type of access desired by the owner, as shown in step 806. As indicated above, the type of access may be read, write or execute access. If the owner's permissions control number matches the type of access desired by the owner, the owner of the object will be allowed access to property x, as shown in step 807. If, however, the owner's permissions control number does not match the type of access desired by the owner, the owner will not be allowed access to property x, as shown in step 808. If, in step 805, it is determined that the user is not the owner of the object, then the system may determine whether the user belongs to a group in a group access list, as shown in step 809. If the user belongs to a group in the group access list, the system may determine whether the property level permissions control number for the particular group matches the type of access desired by the user, as shown in step 810. If the group's permissions control number matches the type of access desired by the user, the user will be allowed access to property x, as shown in step 811. If, however, the group's permissions control number does not match the type of access desired by the user, the user will not be allowed access to property x, as shown in step 812. In step 809, if it is determined that the user does not belong to a group in the group access list, the system may determine whether the property level permissions control number for the other users matches the type of access desired by the user, as shown in step 813. If the other users permissions control number matches the type of access desired by the user, the user will be allowed access to property x, as shown in step 814. If, however, the other users permissions control number does not match the type of access desired by the user, the user will not be allowed access to property x, as shown in step 815.

Embodiments of the present invention can be applied to complex objects, where complex objects comprise a plurality of sub-objects. For example, the property access control list may include properties in the sub-objects and the sub-objects would not have their own property access list.

Through the above-described system and method of applying property level controls to properties of database objects, enhanced while efficient control of properties spanning objects is now possible. The above description and accompanying drawings, describe preferred embodiments of the present invention in detail. It is to be understood, however, that the invention is not limited to these illustrative embodiments. Various changes and modifications may be affected therein by one skilled in the art without departing from the true spirit and full scope of the invention as defined in the attached claims.

We claim:

1. A computer readable medium having an object oriented database stored thereon comprising:
   a database comprising at least one object, the at least one object containing a plurality of properties; and
   a property access control list comprising a property level permissions set corresponding to a particular one of the plurality of properties, the property level permissions set indicating a level of access permitted to the particular one of the plurality of properties.

2. The computer readable medium of claim 1, further comprising an object level permissions control number, the object level permissions control number indicating a level of access permitted to the at least one object.

3. The computer readable medium of claim 1, the property access control list residing within the at least one object.

4. The computer readable medium of claim 3, the property access control list residing external to the at least one object in the object oriented database.

5. The computer readable medium of claim 3, the object oriented database further comprising:
   a group access list comprising at least one user group having access to the particular one of the plurality of properties.

6. The computer readable medium of claim 5, the group access list residing within the at least one object.

7. The computer readable medium of claim 6, the group access list residing external to the at least one object in the object oriented database.

8. The computer readable medium of claim 6, the property level permissions set further comprising:
   a property name identifying the particular one of the plurality of properties; and
   a permissions control number associated with the property name, the permissions control number indicating at least property level read and write permissions for controlling read and write access to the particular one of the plurality of properties.

9. The computer readable medium of claim 8, the permissions control number comprising a plurality of three bit fields, wherein a first field of the plurality of three bit fields comprising at least two bits of the three bit field for indicating at least property level read and write permissions for controlling read and write access to the particular one of the plurality of properties.

10. The computer readable medium of claim 9, the first field for indicating at least property level read and write access to an owner of the at least one object.

11. The computer readable medium of claim 9, wherein the permissions control number further comprises:
   at least a portion of a field for indicating an execute permission for controlling execution access to the particular one of the plurality of properties.

12. The computer readable medium of claim 11, the first of the plurality of three bit fields further comprising a third bit for indicating the execution permission for controlling execution access to the particular one of the plurality of properties.

13. The computer readable medium of claim 11, the plurality of three bit fields further comprising a second field for indicating at least property level read and write access to other users.

14. The computer readable medium of claim 11, the plurality of three bit fields further comprising a third field for indicating at least property level read and write access to the at least one user group in the group access list.

15. The computer readable medium of claim 11, the property access control list further comprising additional property level permissions sets for indicating a level of access permitted to additional ones of the plurality of properties.

16. The computer readable medium of claim 15, the property access control list further comprising property identifier numbers for the plurality of properties in the at least one object.

17. The computer readable medium of claim 15, the property access control list further comprising property names for the plurality of properties having property level permissions control numbers different from an object level permissions control number of the at least one object, the object level permissions control number for indicating a level of access to the at least one object.

18. The computer readable medium of claim 1, the property level permissions set further comprising:
   an index reference number, the index reference number indexing a property name in an index reference list; and
   a permissions control number associated with the index reference number, the permissions control number indicating permissions for controlling property level access to the property name indexed by the index reference number.

19. A computer readable medium having an object oriented database stored thereon comprising:
   a database comprising at least one object, the at least one object containing a plurality of properties; and
   a permissions set containing a database level permissions set indicating a level of access permitted to the database, an object level permissions set indicating a level of access permitted to the at least one object, and a property level permissions set indicating a level of access permitted to a particular one of the plurality of properties.

20. The computer readable medium of claim 19, the property level permissions set residing in a property access control list, the property access control list containing at least property names identifying properties having access requirements different from the object level permissions set.

21. The computer readable medium of claim 20, further comprising:
   a group access list comprising at least one user group having access to the particular one of the plurality of properties.

22. A computer system containing a database comprising:
   an object containing a plurality of properties; and
   a property access control list comprising a property level permissions set corresponding to a particular one of the plurality of properties, the property level permissions set indicating a level of access permitted to the particular one of the plurality of properties.

23. The computer system of claim 22, the property level permissions set further comprising:
   a property name identifying the particular one of the plurality of properties; and
   a permissions control number associated with the property name, the permissions control number indicating at least property level read and write permissions for controlling read and write access to the particulat one of the plurality of properties.

24. The computer system of claim 23, further comprising an object level permissions control number, the object level permissions control number indicating a level of access permitted to the object.

25. The computer system of claim 24, the property access control list containing at least property names identifying properties having access requirements different from the object level permissions control number.

26. A method for controlling property level user access to a plurality of properties in an object of an object oriented database, the method comprising the steps of:

establishing a property access control list, the property access control list comprising a plurality of property names and a plurality of corresponding permissions control numbers indicating a level of user access permitted to properties identified by the plurality of property names;

determining whether the property name for a desired property is listed in the property access list; and if the property name for the desired property is not listed in the property access list, permitting user access to the desired property.

27. The method as recited in claim 26 further comprising the step of:

if the property name for the desired property is listed in the property access list, retrieving a permissions control number corresponding to the desired property name from the property access list, the permissions control number designating a level of user access to the desired property.

28. The method as recited in claim 27 further comprising the steps of:

determining whether the user is an owner of the object;

if the user is the owner of the object, comparing a permissions control field for owner access with a type of access desired by the owner; and if there is a match, permitting owner access to the desired property.

29. The method as recited in claim 28 further comprising the step of:

denying owner access to the desired property if the permissions control field for owner access does not match the type of access desired by the owner.

30. The method as recited in claim 28 further comprising the steps of:

if the user is not the owner of the object, determining whether the user belongs to at least one group in a group access list;

if the user belongs to at least one group in the group access list, comparing a permissions control field for group access with the type of access desired by the user; and if there is a match, permitting user access to the desired property.

31. The method as recited in claim 30 further comprising the step of:

denying user access to the desired property if the permissions control field for group access does not match the type of access desired by the user.

32. The method as recited in claim 30 further comprising the steps of:

if the user does not belong to at least one group in the group access list, comparing a permissions control number for other users access with the type of access desired by the user; and if there is a match, permitting user access to the desired property.

33. The method as recited in claim 32 further comprising the steps of:

denying user access to the desired property if the permissions control number for other users access does not match the type of access desired by the user.

34. A method for controlling object level user access to an object of an object oriented database, the method comprising the steps of:

establishing an object level permissions control number, the object level permissions control number for permitting object level user access control;

determining whether the user is an owner of the object;

if the user is the owner of the object, comparing an object level permissions control field for owner access with a type of access desired by the owner; and if there is a match, permitting owner access to the property.

35. The method as recited in claim 34 further comprising the step of:

denying owner access to the object, if the object level permissions control field for owner access does not match the type of access desired by the owner.

36. The method as recited in claim 35 further comprising the steps of:

if the user is not the owner of the object, determining whether the user belongs to at least one group in a group access list;

if the user belongs to at least one group in the group access list, comparing an object level permissions control field for group access with the type of access desired by the user; and if there is a match, permitting user access to the object.

37. The method as recited in claim 36 further comprising the step of:

denying user access to the object if the object level permissions control field for group access does not match the type of access desired by the user.

38. The method as recited in claim 36 further comprising the steps of:

if the user does not belong to at least one group in the group access list, comparing an object level permissions control field for other users access with the type of access desired by the user; and if there is a match, permitting user access to the object.

39. The method as recited in claim 36 further comprising the steps of:

denying user access to the object if the permissions control number for other users access does not match the type of access desired by the user.

40. A method for configuring an object oriented database having an object with a plurality of properties, comprising the steps of:

establishing a database level permissions set indicating a level of access permitted to the database;

establishing an object level permissions set indicating a level of access permitted to the object;

establishing a property level permissions set indicating a level of access permitted to particular one of the plurality of properties; and regulating access of a user to the database based upon the database level permissions set, the object level permissions set, and the property level permissions set.

41. The computer readable medium of claim 1, wherein the particular one of the plurality of properties is an attribute.

42. The computer readable medium of claim 1, wherein the particular one of the plurality of properties is a relationship.

43. The computer readable medium of claim 1, wherein the particular one of the plurality of properties is a method.

* * * * *